US011406222B2

United States Patent
Song (10) Patent No.: US 11,406,222 B2
(45) Date of Patent: *Aug. 9, 2022

(54) ELECTRIC HEATER AND COOKING APPLIANCE HAVING SAME

(71) Applicant: LG ELECTRONICS INC., Seoul (KR)

(72) Inventor: Misun Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

This patent is subject to a terminal disclaimer.

(21) Appl. No.: 16/547,005

(22) Filed: Aug. 21, 2019

(65) Prior Publication Data

US 2020/0060469 A1    Feb. 27, 2020

(30) Foreign Application Priority Data

Aug. 21, 2018  (KR) ........................ 10-2018-0097654

(51) Int. Cl.
*H05B 3/10*         (2006.01)
*H05B 3/16*         (2006.01)
(Continued)

(52) U.S. Cl.
CPC ............ *A47J 36/2483* (2013.01); *H05B 3/03* (2013.01); *H05B 3/68* (2013.01); *H05B 3/748* (2013.01);
(Continued)

(58) Field of Classification Search
None
See application file for complete search history.

(56) References Cited

U.S. PATENT DOCUMENTS

| 5,177,341 A | * | 1/1993 | Balderson | ................ H05B 3/26 |
| | | | | 219/466.1 |
| 6,043,467 A | * | 3/2000 | Little | ..................... H05B 3/262 |
| | | | | 219/542 |

(Continued)

FOREIGN PATENT DOCUMENTS

| CN | 101390444 | 3/2009 |
| CN | 101482278 A | 7/2009 |

(Continued)

OTHER PUBLICATIONS

Fukazawa, JP 2018-005999 A, Jan. 2018, partial translation. (Year: 2018).*

*Primary Examiner* — Joseph M. Pelham
(74) *Attorney, Agent, or Firm* — Dentons US LLP (57) ABSTRACT

An electric heater includes a substrate and a plane heating element disposed on one surface of the substrate. The plane heating element includes a first pattern portion including a start point and an end point, a second pattern portion that surrounds at least a portion of the first pattern portion and includes a start point and an end point, which are located at an innermost side of the second pattern portion, and a third pattern portion that surrounds at least a portion of the second pattern portion and includes a start point and the end point, which are located at an outermost side of the third pattern portion. The first pattern portion includes a plurality of first tracks that are space apart from each other and have an arc shape that is increasing in length from a center to an outermost side of the first pattern portion, the second pattern portion includes a plurality of second tracks spaced apart from each other and having an arc shape that is increasing in length from the innermost side to an outermost side of the second pattern portion, the third pattern portion includes a plurality of third tracks spaced apart from each other and having an arc shape that is increasing in length from an (Continued)

innermost side to the outermost side of the third portion, and a width of a third track is wider than a width of a first track.

19 Claims, 4 Drawing Sheets

(51) Int. Cl.
    *H05B 3/26*     (2006.01)
    *H05B 3/68*     (2006.01)
    *A47J 36/24*     (2006.01)
    *H05B 3/03*     (2006.01)
    *H05B 3/74*     (2006.01)
    *H05B 3/28*     (2006.01)

(52) U.S. Cl.
    CPC ............... *H05B 3/265* (2013.01); *H05B 3/28* (2013.01); *H05B 2203/003* (2013.01); *H05B 2203/013* (2013.01)

(56) References Cited

U.S. PATENT DOCUMENTS

| | | | |
|---|---|---|---|
| 8,143,557 B2 | 3/2012 | Shibata et al. | |
| 9,894,716 B2 | 2/2018 | Mohr | |
| 10,314,113 B2 | 6/2019 | Russegger et al. | |
| 2002/0088111 A1* | 7/2002 | Von Arx | H05B 3/28 29/613 |
| 2003/0044173 A1* | 3/2003 | Natsuhara | H05B 3/265 392/467 |
| 2003/0075537 A1* | 4/2003 | Okajima | H01L 21/67103 219/444.1 |
| 2004/0074893 A1* | 4/2004 | Wermbter | H05B 3/748 219/465.1 |
| 2005/0199610 A1 | 9/2005 | Ptasienski et al. | |
| 2010/0193502 A1* | 8/2010 | Kim | H05B 3/748 219/482 |
| 2015/0163863 A1* | 6/2015 | Wegener | H05B 3/262 219/202 |
| 2015/0208669 A1 | 7/2015 | Klock et al. | |
| 2018/0254204 A1 | 9/2018 | Jung et al. | |
| 2020/0060468 A1* | 2/2020 | Song | H05B 3/74 |
| 2020/0060469 A1* | 2/2020 | Song | H05B 3/748 |
| 2020/0063972 A1* | 2/2020 | Song | H05B 3/74 |
| 2020/0063974 A1* | 2/2020 | Song | F24C 7/067 |
| 2020/0063976 A1* | 2/2020 | Song | H05B 3/03 |
| 2020/0063977 A1* | 2/2020 | Song | H05B 3/03 |
| 2020/0068664 A1* | 2/2020 | Song | H05B 3/26 |
| 2020/0113378 A1* | 4/2020 | Song | H05B 3/26 |
| 2020/0120759 A1* | 4/2020 | Song | H05B 3/748 |
| 2020/0396801 A1* | 12/2020 | Unno | H05B 3/283 |
| 2021/0262967 A1* | 8/2021 | Tatara | G01N 27/128 |

FOREIGN PATENT DOCUMENTS

| | | |
|---|---|---|
| CN | 103118450 A | 5/2013 |
| CN | 104378858 A | 2/2015 |
| CN | 106134285 A | 11/2016 |
| CN | 108028199 A | 5/2018 |
| EP | 228808 | 7/1987 |
| EP | 0994666 A1 | 1/1999 |
| GB | 2287388 A | 9/1995 |
| GB | 2322273 A | 8/1998 |
| JP | 2005100695 A | 4/2005 |
| JP | 201453574 A | 3/2014 |
| JP | 20185999 A | 1/2018 |
| KR | 1020080081360 A | 9/2008 |
| KR | 1020090009599 A | 1/2009 |
| KR | 1020090009600 A | 1/2009 |
| KR | 101762159 | 7/2017 |
| WO | 2009014333 A1 | 1/2009 |

\* cited by examiner

ELECTRIC HEATER AND COOKING APPLIANCE HAVING SAME

CROSS-REFERENCE TO RELATED APPLICATIONS

This application claims priority to Korean Patent Application No. 10-20018-0097654, filed on Aug. 21, 2018, which is hereby incorporated by reference in its entirety.

FIELD OF THE DISCLOSURE

The present disclosure relates to an electric heater applied to a cooking appliance, and to an electric heater including a plane heating element capable of ensuring a heating temperature and a heating value of a pattern portion located at an outermost side of a limited area.

BACKGROUND

In general, a cooking appliance refers to a device for heating and cooking food using gas or electricity. Various devices such as a microwave oven using microwaves, an oven using a heater, a gas stove using gas, an electric stove using electricity, or a cooktop including a gas stove or an electric stove have come into widespread use for heating and cooking.

The gas stove directly generates flame using gas as a heating source, while the electric stove heats a container and food placed on a top plate thereof using electricity.

In the gas stove, heat loss of the flame may be large and contaminants may be discharged due to incomplete combustion, thereby polluting indoor air. Therefore, recently, electric stoves are attracting attention.

Electric stoves may be classified into an inductive electric stove which directly heats a container in which a magnetic field is generated by a magnetic induction method, and a resistive electric stove which heats a top surface made of, for example, ceramic using a hot wire.

The inductive electric stove has a short cooking time at a high temperature and uses a dedicated magnetic container. The resistive electric stove may use an existing container but has a relatively long cooking time.

Even if an existing resistive electric stove uses a heating element made of a nichrome wire, an electric heater using a plane heating element is being developed in order to reduce the thickness of the heating element.

In addition, in order to shorten the cooking time, a resistive electric stove using an electric heater capable of heating a limited area at a high temperature is being developed.

As an example of such an electric heater, Korean Patent Registration No. 10-1762159 B1 (published on Aug. 4, 2017) discloses a plane heating element including a substrate having a surface made of an electrically insulating material, a heating element attached to the surface of the substrate and having a predetermined shape, and a power supply for supplying electricity to the heating element.

In the electric heater, the temperature distribution of an object to be heated may be changed according to the shape (that is, the pattern) of the plane heating element, and the plane heating element may be formed in a shape capable of heating the object to be heated as uniformly as possible.

The plane heating element of the electric heater includes a plurality of tracks having a straight-line shape or an arc shape and adjacent tracks of the plurality of tracks may be connected through a bridge (or a track).

As another example of the heater, European Patent Publication No. EP 0,228,808 A2 (published on Jul. 15, 1987) discloses a temperature sensitive device. Such a device is configured by printing a heater track made of a conductive material and a plurality of electrodes on a ceramic coating layer. As current is supplied through the electrodes, radiant heat is generated in the heater track.

However, the existing plane heating element includes a heating unit in which a single hot wire is formed within a limited area in a predetermined pattern shape, and the heating unit is designed to have a high resistance in order to generate heat at a high temperature of 500° C. or higher.

Also, the power required for each size of the cooking appliance differs, and configuring the pattern portion with only one hot wire in order to heat up to a high temperature step by step according to the user's need may be difficult.

SUMMARY

It may be possible to provide a plane heating element having a plurality of pattern portions, and the necessary power distributed for each pattern portion. The limited area is divided into each zone proportional to the required power of each pattern portion, and then each pattern portion corresponding to each zone is formed.

However, the pattern portion located at the outermost side of the limited area is more likely to be deprived of heat by the surroundings than the other pattern portions, and thus it may be difficult to maintain a heating temperature similar to other pattern portions due to high heat loss.

In addition, in a case where the pattern portion located at the outermost side of the limited area is designed with a relatively large required power among the total required power, the heat loss becomes larger, such that the heating value cannot be realized by the total required power.

One aspect is to provide an electric heater including a plane heating element capable of ensuring a heating temperature and a heating value of a pattern portion located at an outermost side of a limited area.

An electric heater includes a substrate; and a plane heating element disposed on one surface of the substrate; in which the plane heating element includes a first pattern portion including a start point and an end point, a second pattern portion that surrounds at least a portion of the first pattern portion and includes a start point and an end point, which are located at an innermost side of the second pattern portion, and a third pattern portion that surrounds at least a portion of the second pattern portion and includes a start point and an end point, which are located at an outermost side of the third pattern portion, the first pattern portion includes a plurality of first tracks that are spaced apart from each other and having an arc shape that is increasing in length from a center to an outermost side of the first pattern portion, the second pattern portion includes a plurality of second tracks outside of the first pattern portion that are spaced apart from each other and having an arc shape that is increasing in length from the innermost side to an outermost side of the second pattern portion, the third pattern portion includes a plurality of third tracks outside of the second pattern portion that are spaced apart from each other and having an arc shape that is increasing in length from an innermost side to the outermost side of the third pattern portion, and a width of a third track is wider than a width of a first track or wider than a width of a second track.

In addition, it is preferable that a gap between third tracks adjacent to each other is wider than a gap between first tracks adjacent to each other or wider than a gap between second tracks adjacent to each other.

In addition, the first pattern portion includes a plurality of first bridges connecting the plurality of first tracks in series, the second pattern portion includes a plurality of second bridges connecting the plurality of second tracks in series, and the third pattern portion includes a plurality of third bridges connecting the plurality of third tracks in series.

In addition, it is preferable that a length of a third bridge is longer than a length of a first bridge or longer than a length of a second bridge.

In addition, it is preferable that the plurality of first, second, and third bridges are an arc shape having a predetermined width, and a radius of curvature of the third bridge is longer than a radius of curvature of the first bridge or longer than a radius of curvature of the second bridge.

In addition, a number of the plurality of third bridges is smaller than a number of the plurality of first bridges and a number of the plurality of second bridges.

In addition, the plane heating element may include a pair of first electrodes connected to the start point and the end point of the first pattern portion, a pair of second electrodes connected to the start point and the end point of the second pattern portion, and a pair of third electrodes connected to the start point and the end point of the third pattern portion.

In addition, the required power of the third pattern portion may be 40% or more with respect to the power required for the entire first, second, and third pattern portions.

An electric heater includes a substrate; and a plane heating element disposed on one surface of the substrate; in which the plane heating element includes a first pattern portion including a start point and an end point, and a second pattern portion that surrounds at least a portion of the first pattern portion and including a start point and an end point, which are located at an innermost side or an outermost side of the second pattern portion, and the first pattern portion includes a plurality of first tracks that are spaced part from each other and having an arc shape that is increasing in length from a center to an outermost side of the first pattern portion, the second pattern portion includes a plurality of second tracks outside of the first pattern portion that are spaced apart from each other and having an arc shape that is increasing in length from the innermost side to the outermost side of the second pattern portion, and a width of a second track is wider than a width of a first track.

In addition, a gap between second tracks adjacent to each other may be longer than a gap between first tracks adjacent to each other.

In addition, the first pattern portion may include a plurality of first bridges connecting the plurality of first tracks in series, and the second pattern portion may include a plurality of second bridges connecting the plurality of second tracks in series.

In addition, a length of the second bridge may be longer than a length of the first bridge.

In addition, the plurality of first and second bridges may be an arc shape having a predetermined width.

In addition, a radius of curvature of the second bridge may be longer than a radius of curvature of the first bridge.

In addition, a number of the plurality of second bridges may be smaller than a number of the plurality of first bridges.

In the electric heater, a width of the track of the pattern portion located on the outermost side of the limited area may be wider than that of the track of the other pattern portion, so that the heating value in the outermost zone of the limited area may be increased.

Therefore, since the heating temperature may be kept high in the outermost zone of the limited area, the entire limited area may be heated to a uniform heating temperature.

In addition, even if heat loss occurs in the outermost zone of the limited area, the heating value may be realized by the required power, so that the heating performance may be improved.

DETAILED DESCRIPTION OF THE PREFERRED EMBODIMENTS

Hereinafter, the preferred embodiments will be described in detail with reference to the accompanying drawings. It should be understood, however, that the scope of the inventive concept of the preferred embodiments may be determined from the matters disclosed in the present disclosure, and the spirit of the present invention possessed by the preferred embodiments include implementations such as addition, deletion, modification etc., of components to the preferred embodiments.

Figure 1:
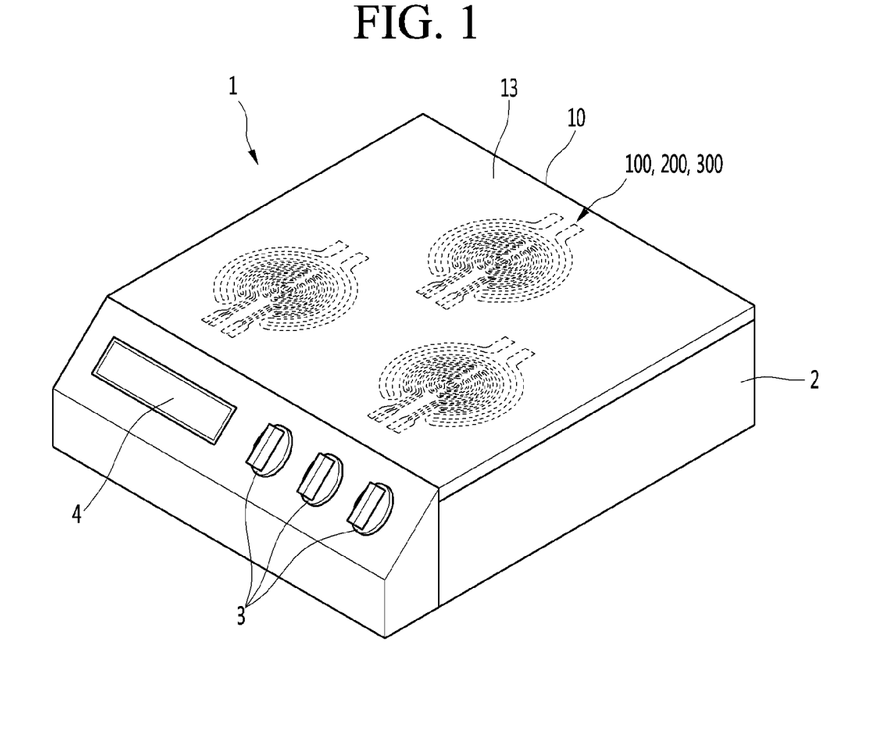
FIG. 1 is a perspective view illustrating an electric stove to which an electric heater is applied according to an embodiment of the present invention.
Figure 2:
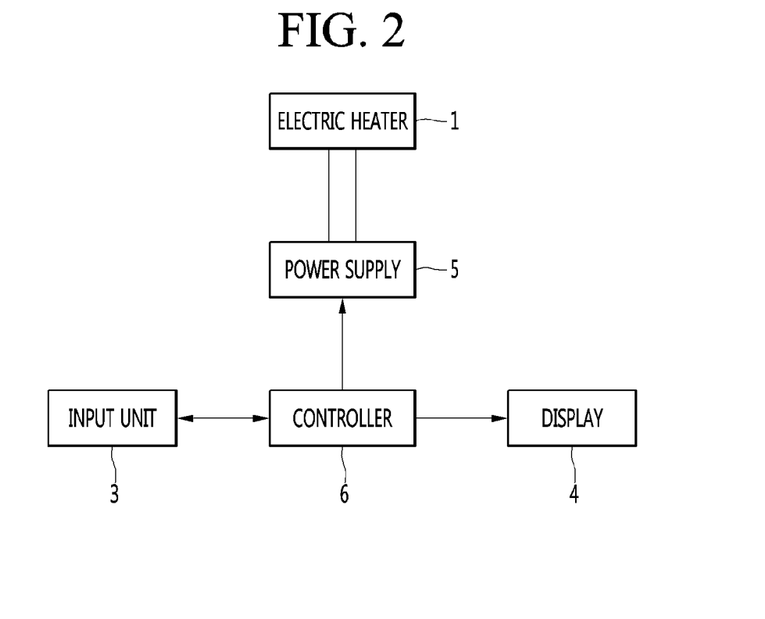
FIG. 2 is a control block diagram of an electric stove to which an electric heater according to an embodiment of the present invention is applied.

FIG. 1 is a perspective view illustrating an electric stove, to which an electric heater according to an embodiment of the present invention is applied, and FIG. 2 is a control block diagram of an electric stove, to which an electric heater according to an embodiment of the present invention is applied.

The electric stove may include a case 2 forming an outer appearance. The electric heater 1 of the present embodiment may configure a portion of the electric stove as a cooktop.

The electric heater 1 may be provided on the case 2. An upper surface of the case 2 may be opened and the electric heater 1 may be provided on the upper surface of the case 2.

The electric stove may include an input unit 3 for manipulating the electric stove and a display 4 for displaying a variety of information such as information on the electric stove. In addition, the electric stove may further include a power supply 5 connected to the electric heater 1 to apply current to the electric heater 1. Based on the configuration of the electric heater 1, the power supply may comprise of a plurality of power supplies. The electric stove may further include a controller 6 for controlling the power supply 5 and the display 4 according to input of the input unit 3. An example of the controller 6 may be a microprocessor, a digital signal processor, an electronic logic circuit, and the like. The controller 6 may control a plurality of plane heating elements 100, 200, 300 together or individually.

The electric heater 1 may be provided on the case 2 such that the upper surface thereof is exposed to the outside. An object to be heated by the electric stove may be placed on the upper surface of the electric heater 1, and the upper surface of the electric heater 1 may be a surface in which the object to be heated is seated.

Figure 3:
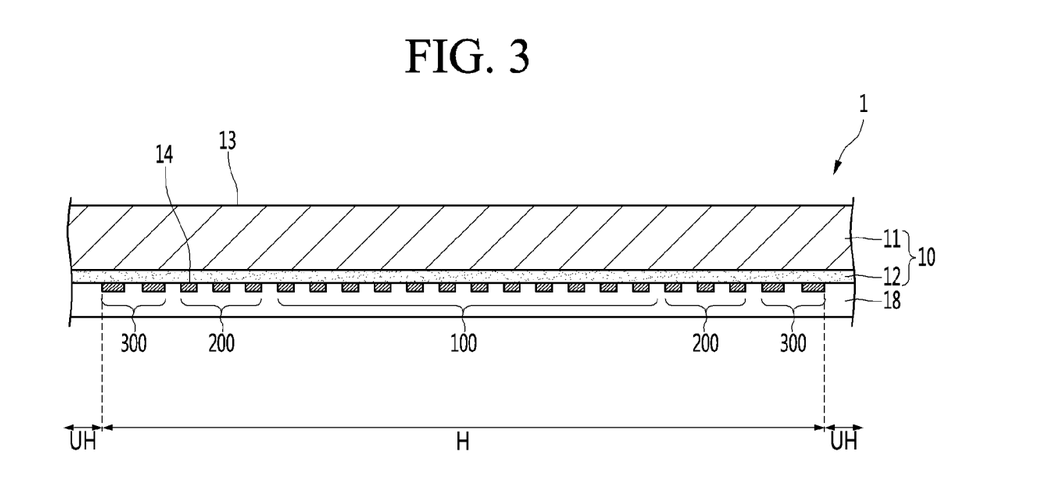
FIG. 3 is a cross-sectional view of an electric heater according to an embodiment of the present invention.

FIG. 3 is a cross-sectional view illustrating an electric heater according to an embodiment of the present invention.

The electric heater 1 may include a substrate 10 and a plurality of plane heating elements 100, 200, and 300 disposed on one surface of the substrate 10.

The substrate 10 may be an insulating substrate having a conductor pattern disposed on a surface thereof. An upper surface of the substrate 10 may be a surface 13 on which an object to be heated is seated. A lower surface of the substrate 10 may be a surface 14 on which the plane heating elements 100, 200, and 300 are disposed.

The substrate 10 may include only a base 11 formed of an insulating material or may include a base 11 formed of an insulating material or a non-insulating material and an insulating layer 12 disposed on one surface of the base 11. Other layers may be added to the base 11.

The base 11 may be made of glass and the insulating layer 12 may be disposed on the lower surface of the glass using a coating or a printing method, etc.

The plane heating elements 100, 200, and 300 may be directly disposed on one surface of the base 11 formed of an insulating material or may be disposed on the insulating layer 12.

The base 11 may be formed in a shape of a plate on which the object to be heated is placed or in a shape of a container in which the object to be heated is received.

The insulating layer 12 may be disposed on the lower surface of the base 11. The insulating layer 12 may be disposed on the entire lower surface of the base 11 or may be disposed on a portion of the lower surface of the base 11. The insulating layer 12 may be disposed only in a zone in which the plane heating elements 100, 200, and 300 will be disposed. The insulating layer 12 may configure the entire lower surface of the substrate 10 or a portion of the lower surface of the substrate 10.

The plane heating elements 100, 200, and 300 may be disposed on the lower surface 14 of the insulating layer 12. The plane heating elements 100, 200, and 300 may have a size smaller than the substrate 10 and the lower surface of the substrate 10 may have a heated zone H, in which the plane heating elements 100, 200 and 300 are disposed, and an unheated zone UH located around the heated zone H.

The heater 1 may further include a coating layer 18 surrounding the plane heating elements 100, 200, and 300. The coating layer 18 may be formed of an electrically insulating material to protect the plane heating elements 100, 200, and 300.

The substrate 10 of the present embodiment may be formed of a flexible material, such as a flexible insulating film. In this case, the electric heater 1 may be a flexible planar heater. Such a flexible planar heater may be attached to a member, on which the object to be heated is placed, to heat the object to be heated, like the upper plate of the electric stove.

Figure 4:
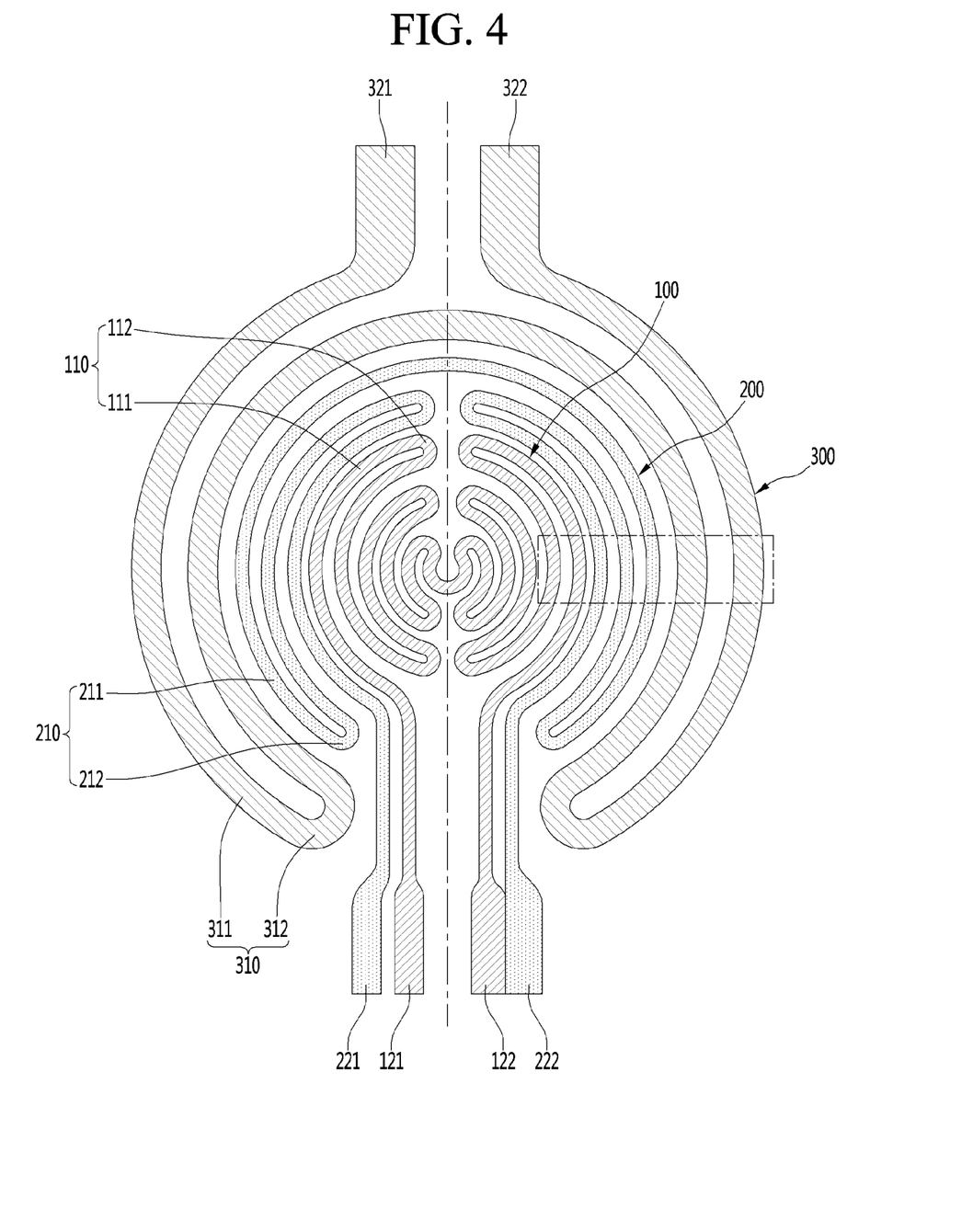
FIG. 4 is a plan view illustrating a triple-type plane heating element according to an embodiment of the present invention.

FIG. 4 is a plan view illustrating a triple-type plane heating element according to an embodiment of the present invention.

As illustrated in FIG. 4, the triple-type plane heating element according to the embodiment of the present invention includes a first plane heating element 100, a second plane heating element 200, and a third plane heating element 300 disposed on the same plane. The first plane heating element 100 is located at the center, the second plane heating element 200 is located to surround the first plane heating element 100, and the third plane heating element 300 is located so as to surround the second plane heating element 200.

The first plane heating element 100 includes a first pattern portion 110 in which a hot wire is arranged in a predetermined shape in a circular first zone and a pair of first electrodes 121 and 122 connected to the first pattern portion 110.

The first pattern portion 110 is a heating unit which generates heat at 600° C. or more, and a hot wire constituting the first pattern portion 110 includes a start point and an end point, which are located at an outermost side of the first zone, along various paths, and the first pattern portion 110 is configured in a symmetrical shape in the lateral direction with respect to a reference line passing through a center of the first pattern portion 110.

According to the embodiment, the first pattern portion 110 may include a plurality of first tracks 111 having an arc shape increasing in size from the center to the outermost side of the first pattern portion 110 and a first bridge 112 connecting the first tracks 111 in series.

The area on which the first pattern portion 110 is disposed and the length of the hot wire which constitutes the first pattern portion 110 may be set in proportion to the required power.

For example, in order to realize a required power of 515 W in a 4-inch size, the first pattern portion 110 may be arranged such that a hot wire having a width of 5 mm and a length of 101 mm in a circular zone having a diameter of 99 mm is maintained at an gap of 2 to 4 mm, and a number N1 of the first bridges 112 connecting the first tracks 111 having an arc shape, which are symmetrical with each other about the reference line in the lateral direction is 11, but is not limited thereto.

The first electrodes 121 and 122 are unheated units which generate heat at 200° C. or less or are hardly heated, and include the first positive electrodes 121 to which current is inputted and the first negative electrodes 122 from which current is outputted.

The first positive electrode 121 and the first negative electrode 122 are unheated units and are preferably located outside the second and third pattern portions 210 and 310, which are heating units to be described below, with a predetermined gap.

The first positive electrode 121 extends from the start point of the first pattern portion 110 and the first negative electrode 122 extends from the end point of the first pattern portion 110.

However, the resistance of the first electrodes 121 and 122 is configured to be small in order to greatly reduce the heating temperature than that of the first pattern portion 110, and the thickness of the first electrodes 121 and 122 may be configured to be thicker than that of the first pattern portion 110.

When current is supplied to the first plane heating element 100 having the above configuration, current flows sequentially along the first positive electrode 121, the first pattern portion 110, and the first negative electrode 122.

The second plane heating element 200 includes a second pattern portion 210 in which a hot wire is arranged in a predetermined shape in a second ring-shaped zone surrounding the first pattern portion 110, and a pair of second electrodes 221 and 222 connected to the second pattern portion 210.

The second pattern portion 210 is also a heating unit which generates heat at 600° C. or more like the first pattern portion 110, and the hot wire constituting the second pattern portion 210 includes a start point and an end point, which are located at a second zone, along various paths, and the second pattern portion is configured with a symmetrical shape in the lateral direction about the reference line.

According to the embodiment, the second pattern portion 210 may also include a plurality of second tracks 211 and a plurality of second bridges 212 in a symmetrical shape like the first pattern portion 110.

In order to keep a potential difference between the first and second pattern portions 110 and 210 low, it is preferable that the start point and the end point of the second pattern portion 210 are located at an innermost side of the second zone so as to be close to the start point and the end point of the first pattern portion 110.

The area on which the second pattern portion 210 is disposed and the length of the hot wire constituting the second pattern portion 210 may be set in proportion to the required power.

For example, in order to realize a required power of 500 W in a size of 6 inches, the second pattern portion 210 may be arranged such that a hot wire having a width of 5.5 mm and a length of 110.5 mm in a ring-shaped zone having a diameter of 99 to 152 mm is maintained at an gap of 3 to 4 mm and a number N2 of the second bridges 212 connecting the second tracks 211 having an arc shape which is symmetrical about the reference line in the lateral direction may be four but is not limited thereto.

The second electrodes 221 and 222 are also unheated units which generate heat at 200° C. or less or hardly generates heat and include a second positive electrode 221 and a second negative electrode 222.

It is preferable that the second positive electrode 221 and the second negative electrode 222 are also unheated units and are located outside the second pattern portion 210 at a predetermined gap.

The second positive electrode 221 extends from the start point of the second pattern portion 210 and the second negative electrode 222 extends from the end point of the second pattern portion 210.

However, the resistance of the second electrodes 221 and 222 is also configured to be small in order to greatly reduce the heating temperature than that of the second pattern portion 210, and the thickness of the second electrodes 221 and 222 may be configured to be thicker than that of the second pattern portion 210.

The first and second electrodes 121, 122, 221 and 222 are located in the same direction as the start point and the end point of the first and second pattern portions 110 and 210 are located adjacent to each other. In this configuration, current may be supplied to the first positive electrode 121 and the second positive electrode 221 by one power supply.

In order to keep a potential difference between the first and second electrodes 121, 122, 221 and 222 low, it is preferable that the first and second positive electrodes 121 and 221 are located adjacent to each other and the first and second negative electrodes 122 and 222 are located adjacent to each other.

When current is supplied to the second plane heating element 200 constructed as described above, current flows sequentially through the second positive electrode 221, the second pattern portion 210, and the second negative electrode 222.

The third plane heating element 300 includes a third pattern portion 310 in which a hot wire is arranged in a predetermined shape in a third ring-shaped zone surrounding the second pattern portion 210, and a pair of third electrodes 321 and 322 connected to the third pattern portion 310.

The third pattern portion 310 is a heating unit which generates heat at 600° C. or more like the first pattern portion 110, the hot wire constituting the third pattern portion 310 includes a start point and an end point, which are located at a third zone, along various paths, and the third pattern portion is configured with a symmetrical shape about the reference line in the lateral direction.

According to the embodiment, the third pattern portion 310 may also include a plurality of third tracks 311 and a plurality of third bridges 312 in a symmetrical shape in the lateral direction like the first pattern portion 110.

When the start point and the end point of the second pattern portion 210 are located at the innermost side of the second zone, it is difficult for the start point and the end point of the third pattern portion 310 to be located so as to be close to the start point and the end point of the second pattern portion 210.

Accordingly, in order to reduce a potential difference between the second and third pattern portions 210 and 310, it is preferable that the start point and the end point of the third pattern portion 310 are located at an outermost side of the third zone so as to be farther from the start point and the end point of the second pattern unit 210.

The area on which the third pattern portion 310 is disposed and the length of the hot wire constituting the third pattern portion 310 may be set in proportion to the required power.

For example, in order to realize the required power of 1085 W in the 8 inch size, the third pattern portion 310 may be arranged such that a hot wire having a width of 11 mm and a length of 102.5 mm in a ring-shaped zone having a diameter of 152 to 225 mm may be arranged so as to maintained at an gap of 9 mm, and a number N3 of the third bridges 312 connecting the third tracks 311 having an arc shape symmetrical about the reference line in the lateral direction may be two but is not limited thereto.

It is preferable that the third electrodes 321 and 322 are also unheated units which generate heat at 200° C. or less or hardly generates heat, include a third positive electrode 321 and a third negative electrode 322, and is located at a predetermined gap outside the third pattern portion 310.

The third positive electrode 321 extends from the start point of the third pattern portion 310 and the third negative electrode 322 extends from the end point of the third pattern portion 310, and the third electrodes 321 and 322 may be configured to be thicker than the third pattern portion 310 in order to significantly reduce the heating temperature.

The third electrodes 321 and 322 may be located in opposite directions to the first and second electrodes 121, 122, 221, and 222, and current may be supplied to the third positive electrode 321 by a power supply different from the power supply connected to the first and second electrodes 121, 122, 221, and 222.

When a current is supplied to the third plane heating element 300 configured as described above, current flows sequentially along the third positive electrode 321, the third pattern portion 310, and the third negative electrode 322.

When a current is supplied to the first, second, and third plane heating elements 100, 200, and 300 configured as described above, the difference in current density flowing along the inside/outside of the first, second, and third bridges 112, 212, and 312 are large, and thus heating occurs locally, but the resistances of the first, second, and third bridges 112, 212 and 312 are configured to be smaller than the first, second, and third tracks 111, 211 and 311 to prevent local heating.

Accordingly, the total heating value of the first, second, and third pattern portions 110, 210, and 310 is determined by the first, second, and third tracks 111, 211, and 311 rather than the first, second, and third bridges 112, 212, and 312.

If all of the first, second, and third pattern portions 110, 210, and 310 generate heat, since the first and second pattern portions 110 and 210 are surrounded by the third pattern portion 310, that is, a heating zone, the heat loss of the first and second pattern portions 110 and 210 may be relatively small, but since the third pattern portions 310 are surrounded by a non-heated zone, the heat loss of the third pattern portion 310 may be relatively large.

In addition, the total required power is distributed by the first, second, and third pattern portions 110, 210, and 310, and in a case where the required power of the third pattern portion 310 is relatively large or in a case where the required power of the third pattern portion 310 is designed to be 40% or more of the total required power, the heat loss due to the third pattern portion 310 located at the outermost side of the limited area may be greatly more.

Therefore, it is preferable that the third pattern portion 310 is designed to improve the heating temperature and the heating value than those of the first and second pattern portions 310.

Figure 5:
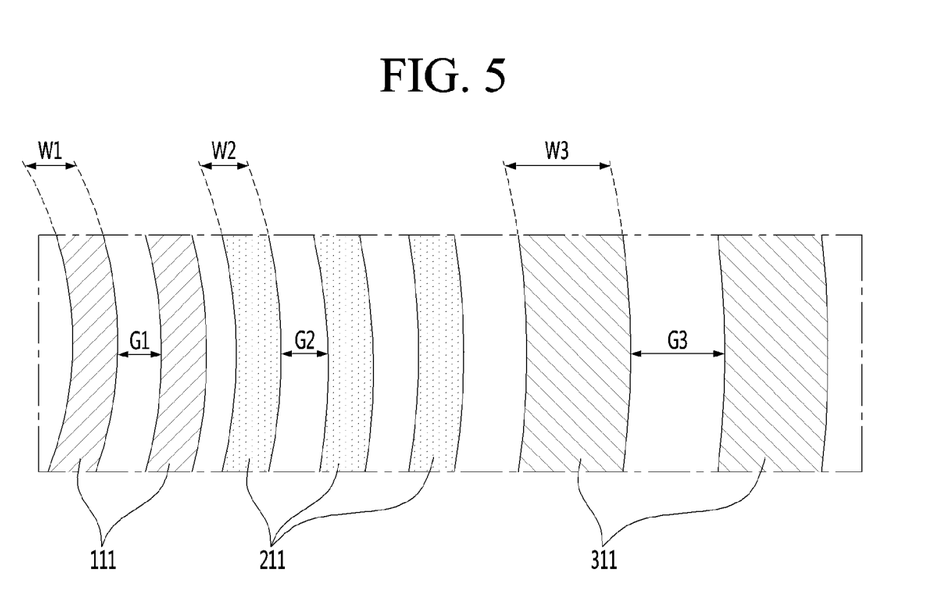
FIG. 5 is a partially enlarged view of FIG. 4.

FIG. 5 is a partially enlarged view of FIG. 4.

According to an embodiment of the present invention, it is preferable that the third track is provided in the outermost zone of the limited area, and in order to increase the heating value of the third track 311, that is, the heating area by the third track 311, a width W3 of the third track 311 is designed to be wider than a width W1 of the first track 111 and a width W2 of the second track 211.

For example, as the width W3 of the third track 311 becomes wider, the heating value may be maintained even if a third gap G3, which is an gap between the adjacent third tracks 311, is configured to be wider.

Therefore, the third gap G3 is designed to be wider than a first gap G1, which is an gap between the adjacent first tracks 111, or a second gap G2, which is an gap between the adjacent second tracks 211.

In the present embodiment, since the bridge connects two tracks spaced apart at a predetermined gap in series, the wider the gap between the two tracks is, the longer the length of the bridge is, and the same may be applied even if the bridge has an arc shape or a straight line shape.

Therefore, it is preferable that a length L3 of the third bridge 312 is designed to be longer than a length L1 of the first bridge 112 or a length L2 of the second bridge 212 (see FIG. 4).

In the present embodiment, in a case where the bridge has an arc shape as illustrated, a radius of curvature of the bridge connecting the two tracks also increases as a gap between the two tracks increases.

Therefore, it is preferable that a curvature radius R3 of the third bridge is designed to be longer than a curvature radius R1 of the first bridge or a curvature radius R2 of the second bridge.

However, since the third track 311 is formed in the ring-shaped zone located on the outermost side of the limited area, the third track 311 is formed into an arc shape longer than the first and second tracks 111 and 211.

Of course, even if the required power is considered, the number of the relatively long third tracks 311 should be smaller than the number of the first tracks 111 or the second tracks 211, which has a relatively short length.

Accordingly, it is preferable that the number N3 of the third bridges connecting the third tracks 311 is provided to be smaller than the number N1 of the first bridges connecting the first tracks 111 in series or the number N2 of the second bridges connecting the second tracks 111 in series.

The present disclosure relates to an electric heater having a plurality of plane heating elements, and may be configured in various ways, such as the number and shape of the plane heating elements, and is not limited thereto. For example, more than three plane heating elements may be configured. For example, the plane heating elements may be square or rectangular shaped. The foregoing description is merely illustrative of the technical idea of the present invention and various changes and modifications may be made by those skilled in the art without departing from the essential characteristics of the present invention.

Therefore, the embodiments disclosed in the present disclosure are intended to illustrate rather than limit the technical idea of the present invention, and the scope of the technical idea of the present invention is not limited by these embodiments.

The scope of protection of the present invention should be construed according to the following claims, and all technical ideas falling within the equivalent scope to the scope of protection should be construed as falling within the scope of the present invention.

What is claimed is:

1. An electric heater comprising:
   a substrate; and
   a plane heating element disposed on one surface of the substrate;
   wherein the plane heating element includes:
      a first pattern portion that is connected to a pair of first electrodes,
      a second pattern portion that surrounds at least a portion of the first pattern portion and that is connected to a pair of second electrodes, and
      a third pattern portion that surrounds at least a portion of the second pattern portion and that is connected to a pair of third electrodes,
   wherein the first pattern portion includes:
      a plurality of first tracks that are spaced apart from each other and having an arc shape that is increasing in length from a center to an outermost side of the first pattern portion,
   wherein the second pattern portion includes:
      a plurality of second tracks outside of the first pattern portion that are spaced apart from each other and having an arc shape that is increasing in length from an innermost side adjacent to the first pattern portion to an outermost side of the second pattern portion,
   wherein the third pattern portion includes:
      a plurality of third tracks outside of the second pattern portion that are spaced apart from each other and having an arc shape that is increasing in length from an innermost side adjacent to the second pattern portion to an outermost side of the third pattern portion, and
   wherein a width of a third track is wider than a width of a first track.

2. The electric heater of claim 1,
   wherein the width of the third track is wider than a width of a second track.

3. The electric heater of claim 1,
   wherein a gap between third tracks adjacent to each other is wider than a gap between first tracks adjacent to each other.

4. The electric heater of claim 1,
   wherein the gap between the third tracks adjacent to each other is wider than a gap between second tracks adjacent to each other.

5. The electric heater of claim 1,
wherein the first pattern portion includes a plurality of first bridges connecting the plurality of first tracks in series,
wherein the second pattern portion includes a plurality of second bridges connecting the plurality of second tracks in series, and
wherein the third pattern portion includes a plurality of third bridges connecting the plurality of third tracks in series.

6. The electric heater of claim 5,
wherein a length of a third bridge is longer than a length of a first bridge.

7. The electric heater of claim 5,
wherein the length of the third bridge is longer than a length of a second bridge.

8. The electric heater of claim 5,
wherein the plurality of first, second, and third bridges are an arc shape having a predetermined width.

9. The electric heater of claim 8,
wherein a radius of curvature of the third bridge is longer than a radius of curvature of the first bridge.

10. The electric heater of claim 8,
wherein the radius of curvature of the third bridge is longer than a radius of curvature of the second bridge.

11. The electric heater of claim 5,
wherein a number of the plurality of third bridges is smaller than a number of the plurality of first bridges and a number of the plurality of second bridges.

12. The electric heater of claim 1,
wherein a required power of the third pattern portion is 40% or more with respect to a power required for an entire first, second, and third pattern portions.

13. A cooking appliance comprising:
a case forming an outer appearance;
a display;
an input unit;
a power supply;
an electric heater provided on the case; and
a controller for controlling the electric heater, the power supply, and the display according to an input from the input unit, wherein
the electric heater includes:
a substrate; and
a plane heating element disposed on one surface of the substrate;
wherein the plane heating element includes:
a first pattern portion including that is connected to a pair of first electrodes, and
a second pattern portion that surrounds at least a portion of the first pattern portion and that is connected to a pair of second electrodes, and
a third pattern portion that surrounds at least a portion of the second pattern portion and that is connected to a pair of third electrodes,
wherein the first pattern portion includes:
a plurality of first tracks that are spaced apart from each other and having an arc shape that is increasing in length from a center to an outermost side of the first pattern portion
wherein the second pattern portion includes:
a plurality of second tracks outside of the first pattern portion that are spaced apart from each other and having an arc shape that is increasing in length from an innermost side adjacent to the first pattern portion to an outermost side of the second pattern portion,
wherein the third pattern portion includes:
a plurality of third tracks outside of the second pattern portion that are spaced apart from each other and having an arc shape that is increasing in length from an innermost side adjacent to the second pattern portion to an outermost side of the third pattern portion, and
wherein a width of a third track is wider than a width of a first track.

14. The electric heater of claim 13,
wherein a gap between second tracks adjacent to each other is wider than a gap between first tracks adjacent to each other.

15. The electric heater of claim 13,
wherein the first pattern portion includes a plurality of first bridges connecting the plurality of first tracks in series, and
wherein the second pattern portion includes a plurality of second bridges connecting the plurality of second tracks in series.

16. The electric heater of claim 15,
wherein a length of a second bridge is longer than a length of a first bridge.

17. The electric heater of claim 15,
wherein the plurality of first and second bridges are an arc shape having a predetermined width.

18. The electric heater of claim 17,
wherein a radius of curvature of the second bridge is longer than a radius of curvature of the first bridge.

19. The electric heater of claim 15,
wherein a number of the plurality of second bridges is smaller than a number of the plurality of first bridges.

* * * * *